United States Patent [19]

Hori

[11] Patent Number: 5,752,841
[45] Date of Patent: May 19, 1998

[54] IC CARD CONNECTOR AND IC CARD READER/WRITER

[75] Inventor: Hirokazu Hori, Kawasaki, Japan

[73] Assignee: Kel Corporation, Tokyo, Japan

[21] Appl. No.: 632,335

[22] Filed: Apr. 11, 1996

[30] Foreign Application Priority Data

Apr. 13, 1995 [JP] Japan .................... 7-112393

[51] Int. Cl.⁶ ........................................ H01R 4/66
[52] U.S. Cl. ........................... 439/108; 439/924.1
[58] Field of Search .................. 439/62, 267, 924.1, 439/108, 945–947

[56] References Cited

U.S. PATENT DOCUMENTS

| | | | |
|---|---|---|---|
| 4,735,578 | 4/1988 | Reichardt et al. | 439/267 |
| 4,814,593 | 3/1989 | Reichardt et al. | 439/267 |
| 5,421,738 | 6/1995 | Roberts | 439/62 |

*Primary Examiner*—Neil Abrams
*Assistant Examiner*—Eugene G. Byrd
*Attorney, Agent, or Firm*—Robert W.J. Usher

[57] ABSTRACT

An IC card connector 10 comprises a grounding contact 13, which touches the surface of an IC card first, and a plurality of data-passing contacts 12, which connect with the surface contacts of the IC card after the grounding contact 13 has touched the surface of the IC card. This contact of the grounding contact 13 prior to the connection of the data-passing contacts 12 is made possible by forming the grounding contact 13 higher than the data-passing contacts 12. In an IC card reader/writer equipped with this IC card connector 10, an IC card inserted into the IC card reader/writer is lowered from above the IC card connector 10, so that the grounding contact 13 touches the lower surface of the IC card first. Through this contact of the grounding contact 13 to the IC card, static electricity over the IC card is discharged before the data-passing contacts 12 connect with the surface contacts of the IC card. In this way, an IC card connector and an IC card reader/writer are realized with capability of removing static electricity from the IC card just before the data-passing contacts of the IC card connector connect with the surface contacts of the IC card.

8 Claims, 4 Drawing Sheets

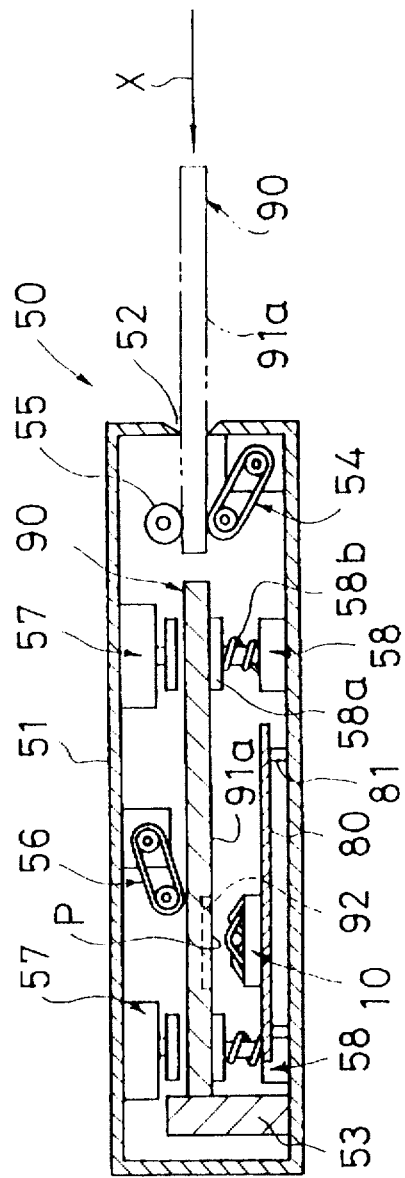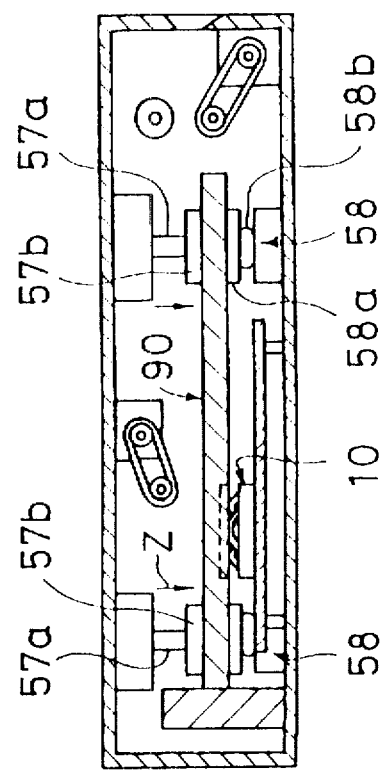
Fig. 2A
Fig. 2B

IC CARD CONNECTOR AND IC CARD READER/WRITER

FIELD OF THE INVENTION

The present invention relates generally to an IC card connector, which connects its contacts with contacts provided on the surface of an IC card, and to an IC card reader/writer, which reads and writes information in an IC card, and more particularly to an IC card connector and an IC card reader/writer, which are capable of discharging static electricity from the IC card being treated.

BACKGROUND OF THE INVENTION

Integrated circuits are packaged in a card form, and this card or IC card is applied, e.g., as a storage for information. For the purpose of reading from and writing into such an IC card, an IC reader/writer is used.

An IC reader/writer is incorporated with an IC card connector, which has a plurality of data-passing contacts to electrically connect with surface contacts provided on the surface of an IC card. When an IC card is taken into an IC reader/writer, the surface contacts of the IC card are connected with the data-passing contacts of the IC card connector in the IC reader/writer. Through this connection, the integrated circuits in the IC card are electrically connected with circuits of the IC card reader/writer which functions for reading and writing information in the IC card.

As the bodies of IC cards are made of plastics, it is likely that they get charged with static electricity. If an IC card, which is charged with static electricity, is inserted into an IC card reader/writer, then the static electricity may affect adversely the circuits of the IC card reader/writer, which a card through the IC card connector incorporated therein.

In order to avoid such trouble from static charge, the IC card reader/writer can be provided with a grounding device placed at the slot which receives an IC card, so that the IC card being inserted into the IC card reader/writer is touched by the grounding device and discharged of static electricity before entering the inside of the IC card reader/writer.

However, the IC card, after passing through the slot, is transferred inside the IC card reader/writer by a card-loading mechanism until it is set at a position where the IC card is connected with the IC card connector of the IC card reader/writer. This process of IC card loading presents a problem that the IC card, which is discharged of static electricity at the slot or entrance of the IC card reader/writer, is recharged with static electricity during the transfer inside the IC card reader/writer.

SUMMARY OF THE INVENTION

The present invention is conceived to solve such problems as mentioned above. It is an object of this invention to provide an IC card connector and an IC card reader/writer which are capable of discharging static electricity from the IC card loaded thereto just before the surface contacts of the IC card are connected with the data-passing contacts of the IC card connector.

This object of the present invention is realized by an IC card connector which comprises a grounding contact, which touches the surface of an IC card being contacted first, a plurality of data-passing contacts, which connect with the surface contacts of the IC card, and a housing, which retains the grounding contact and the data-passing contacts.

In this IC card connector, the grounding contact touches the surface of the IC card before the data-passing contacts connect with the surface contacts of the IC card. As a result, static charge over the IC card is discharged before the data-passing contacts meet the surface contacts of the IC card.

With this construction of the IC card connector, in which the grounding contact is retained together with the data-passing contacts in the housing, production cost of this IC card connector is much lower than the cost of an IC card connector produced with a separate grounding connector for discharging static electricity due to a difference in the number of dies used for casting housings.

For attaining the above object, an IC card reader/writer of the present invention is provided with an IC card connector constructed in such a way that the extrusion height of the grounding contact is higher than that of the data-passing contacts, above the upper surface of the housing.

This IC card reader/writer also comprises a card-transferring mechanism. This card-transferring mechanism transfers an IC card inserted into the IC card reader/writer to a facing position where the IC card is placed opposite to the IC card connector vertically apart in the IC card reader/writer. Then, the IC card or the IC card connector is vertically transferred by a raising/lowering mechanism, so that the IC card and the IC card connector approach each other.

This raising/lowering mechanism may be constructed to transfer either one of the IC card or the IC card connector vertically or with inclination from the above mentioned facing position, so that one approaches the other.

By means of this raising/lowering mechanism, the grounding contact of the IC card connector meets the surface of the IC card first. Then, the data-passing contacts of the IC card connector connect with the surface contacts of the IC card, whereby reading and writing in the IC card are made ready.

In another IC card reader/writer of the present invention, the IC card connector is constructed with a housing which retains a grounding contact laterally apart from the data-passing contacts with a predetermined distance. By means of a card-transferring mechanism provided in the IC card reader/writer, an IC card inserted into the IC card reader/writer is laterally transferred in such a way that the IC card approaches the IC card connector from the side of the grounding contact. Thereby, the grounding contact of the IC card connector meets the surface of the IC card first, and then the data-passing contacts of the IC card connector connect with the surface contacts of the IC card.

With this construction, this IC card reader/writer of the present invention is also capable of discharging static electricity from the IC card being loaded, by making the grounding contact meet the surface of the IC card before the data-passing contacts of the IC card connector connect with the surface contacts of the IC card.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the

Figure 1:
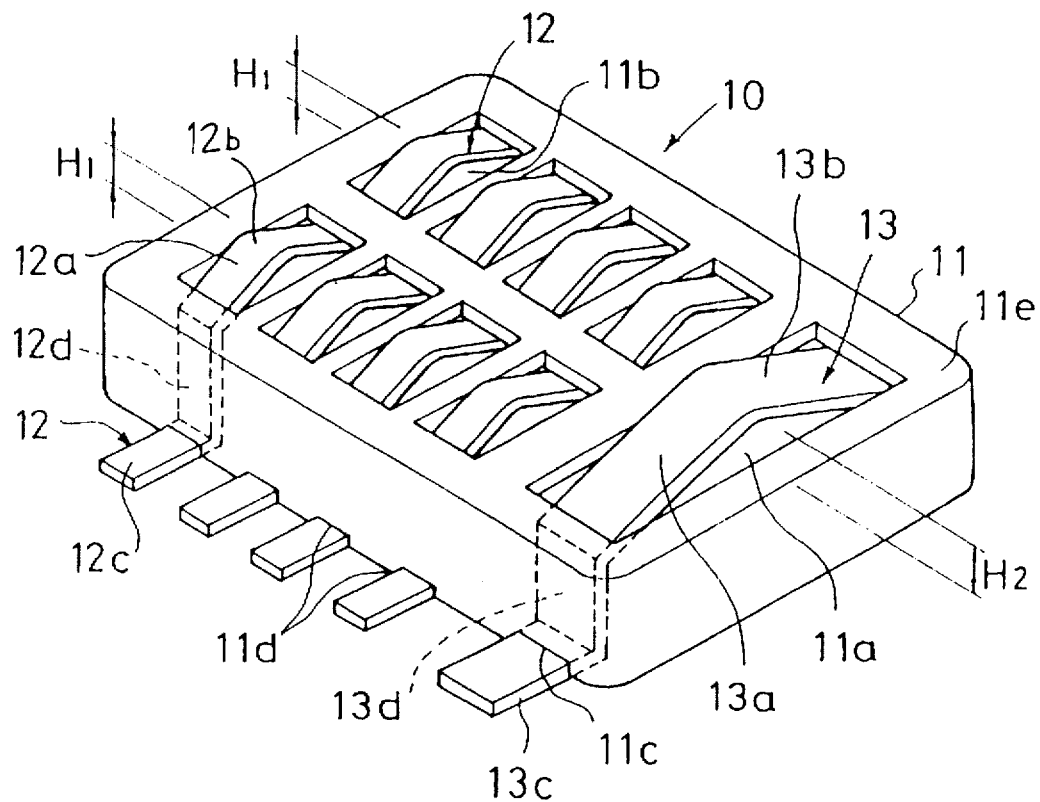
Figure 3:
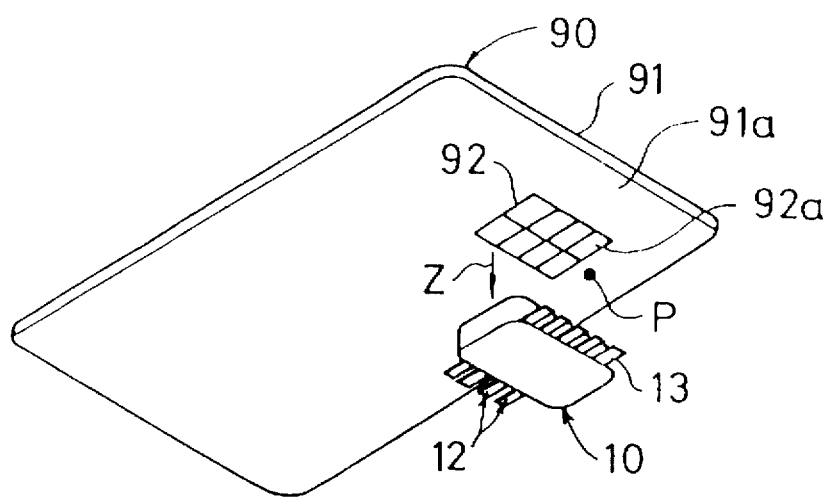
Figure 4A:
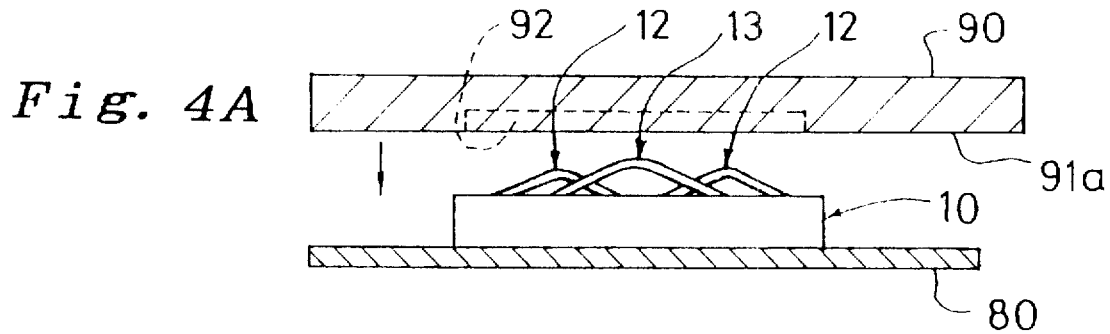
Figure 4B:
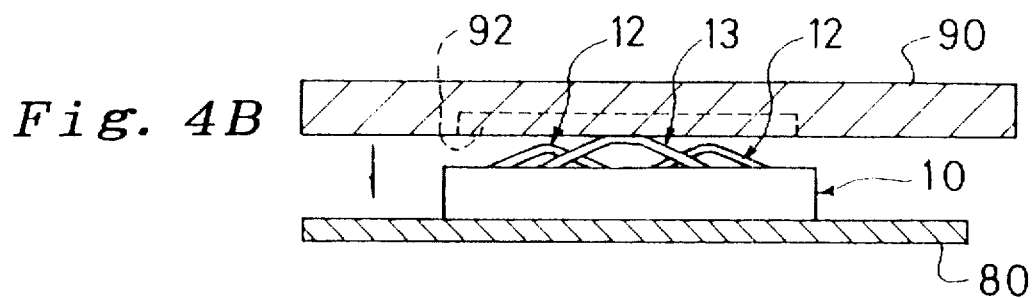
Figure 4C:
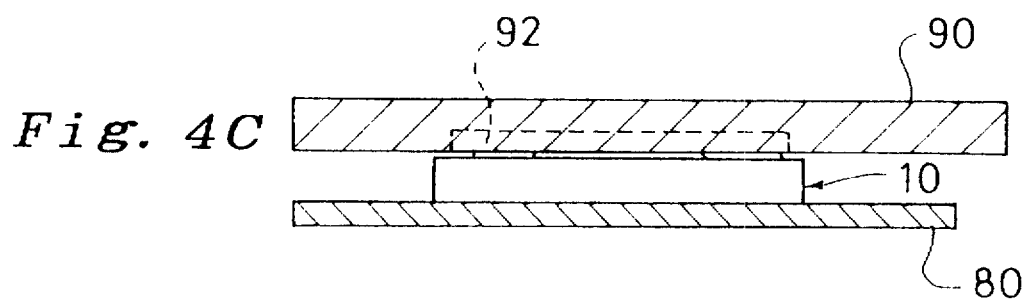
Figure 5:
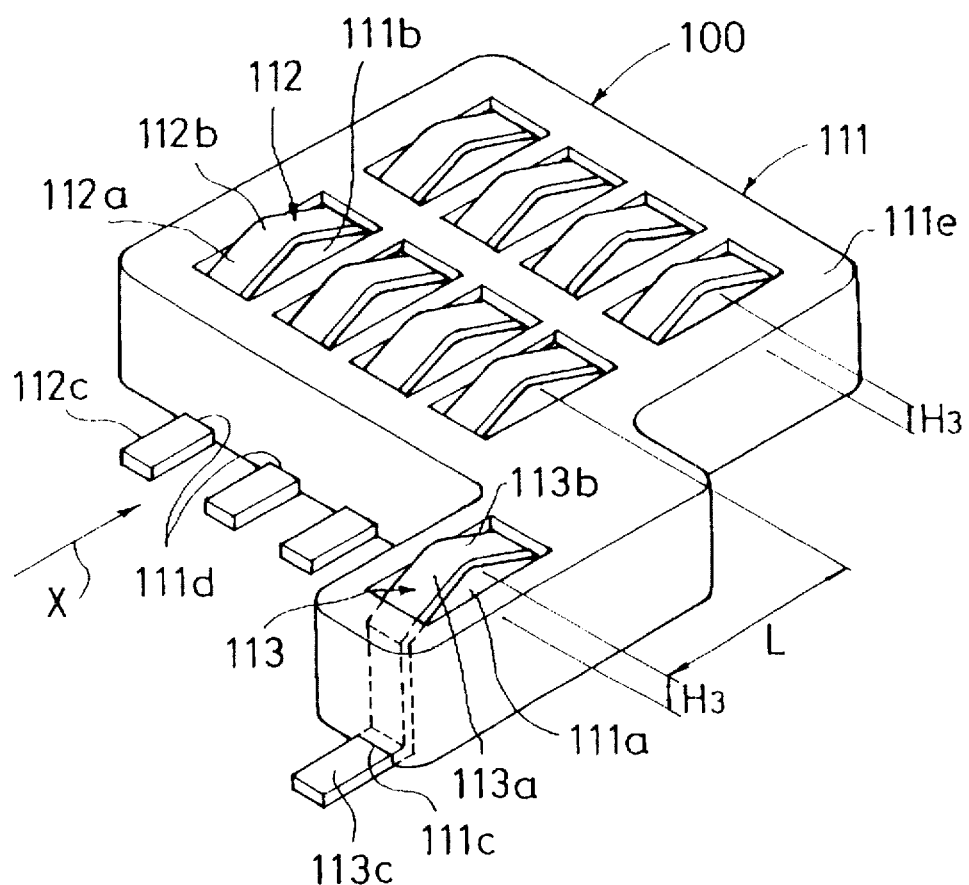

3 accompanying drawings which are given by way of illustration only and thus are not limitative of the present invention and wherein:

FIG. 1 is a perspective view of an embodiment of the IC card connector of the present invention;

FIGS. 2A and 2B are cross-sectional views of an IC card reader/writer equipped with the IC card connector;

FIG. 3 is a perspective view of the IC card connector with an IC card, which is in the process of being lowered for connection with the IC card connector;

FIGS. 4A, 4B and 4C are cross-sectional views of the IC card and the circuit board of the IC card reader/writer, on which the IC card connector is mounted; and FIG. 5 is a perspective view of a second embodiment of the IC card connector of the present invention.

DESCRIPTION OF THE PREFERRED EMBODIMENTS

With reference to FIGS. 2 and 3, description is given of an IC card 90 and an IC card reader/writer 50, which is equipped with an IC card connector 10 of the present invention.

This IC card reader/writer 50 takes the IC card 90 into the main housing 51 and reads and writes information in the memory integrated in the IC card 90.

For the loading of the IC card 90 into the IC card reader/writer 50, the IC card 90 is inserted into the slot 52, which is provided on a side of the main housing 51. When inserting the IC card 90, the lower surface 91a provided with a contact block 92 is placed facing downward. More will be described about the contact block 92 later.

As shown in FIG. 2A, when the front portion of the IC card 90 is inserted into the slot 52, it is caught by a first card-transferring mechanism 54 and a guiding roller 55, both of which are provided near the slot 52 inside the main housing 51. This first card-transferring mechanism 54 carries the IC card 90 into the inside of the main housing 51, transferring it over the support tables 58a of card-supporting mechanisms 58. This transfer of the IC card 90 is relayed to a second card-transferring mechanism 56 so as to transfer the IC card 90 further into the main housing 51 until the front end of the IC card 90 meets a stopper 53.

After meeting the stopper 53, the IC card 90 is lowered by card-lowering mechanisms 57 (also referred to as "raising/lowering mechanism" in other sections) in the direction indicated by "Z" in FIG. 2B. The IC card 90 being lowered is met by the IC card connector 10 incorporated in the main housing 51 of the IC card reader/writer 50.

The contact block 92 is provided on the lower surface 91a of the IC card 90, i.e., on the surface facing downward in FIG. 3 showing the IC card 90 being lowered to an IC card connector 10. A plurality of surface contacts 92a are provided in the contact block 92. These surface contacts 92a are connected to the integrated circuits incorporated in the IC card body 91.

Referring to FIG. 1, an IC card connector 10 of the present invention is described. This IC card connector 10 comprises a housing 11, a plurality of data-passing contacts 12, and a grounding contact 13.

The housing 11 is formed of an insulative material, and it has contact openings 11a and 11b, through which the contacting portions 12a and 13a of the data-passing contacts 12 and the grounding contact 13 extrude a little. The housing 11 also has lead openings 11c and 11d on both sides, through which the lead portions 12c and 13c of the data-passing contacts 12 and the grounding contact 13 extrude.

4

Each data-passing contact 12 is formed of a strip of electrically conductive material which has elasticity, with a lead portion 12c extending horizontally, a vertical portion 12d extending upward from the lead portion 12c, and a contacting portion 12a extending upward with a slant from the vertical portion 12d. Eight pieces of this data-passing contacts 12 are aligned in four rows in two columns in the housing 11 in such a way that each data-passing contact 12 connects with a corresponding surface contact 92a laid out in the contact block 92 of the IC card 90.

Each contacting portion 12a is formed with its center extruding upward in a mountain figure. This extrusion is formed with a height H1, which is measured from the upper surface 11e of the housing 11 to the extruding top 12b of the contacting portion 12a.

The grounding contact 13 is also formed of a strip of electrically conductive material in a similar figure to the data-passing contacts 12, including a lead portion 13c, vertical portion 13d, and contacting portion 13a. This grounding contact 13 is positioned in the housing 11 away from the data-passing contacts 12 with a predetermined distance.

The extruding top 13b of the grounding contact 13 above the upper surface 11e of the housing 11 is formed with a height H2 which is a little higher than the height H1 of the data-passing contacts 12.

This IC card connector 10 is mounted on a circuit board 80 of the IC card reader/writer 50, which is supported by posts 81 in the main housing 51. The lead portions 12c and 13c of the data-passing contacts 12 and grounding contact 13 are soldered to the circuit board 80, whereby the IC card connector 10 is fixed on the circuit board 80. The lead portions 12c of the data-passing contacts 12 are connected to the circuits which are patterned on the surface of the circuit board 80 for the purpose of reading and writing information in the IC card 90. The lead portion 13c of the grounding contact 13 is connected to a grounding circuit, which grounds through the main housing 51 of the IC card reader/writer 50.

The IC card connector 10 is mounted on the circuit board 80 in such a way that each data-passing contact 12 of the IC card connector 10 faces apart vertically a respective surface contact 92a in the contact block 92 of the IC card 90 when the IC card 90 taken into the IC card reader/writer 50 is carried to the position where the frontal end of the IC card 90 is met by the stopper 53 as shown in FIG. 4A.

The IC card 90 in this position is lowered by the card-lowering mechanisms 57.

The card-lowering mechanisms 57 have solenoids, which, by being activated, protrude pushing spindles 57a. Press plates 57b are provided at the lower ends of the pushing spindles 57a, so these press plates 57b directly contact the IC card 90 for lowering it. When a detector (not shown in the figures) detects that the frontal end of the IC card 90 has reached the stopper 53, the card-lowering mechanisms 57 are activated, and the press plates 57b push the IC card 90 downward onto the IC card connector 10.

The card-supporting mechanisms 58, which support the IC card 90 in the IC card reader/writer 50, comprise supporting tables 58a, supporting spindles 58b, and springs 58c. The supporting spindles 58b extend and contract vertically with the support tables 58a, which are biased upward by the springs 58c.

With these card-supporting mechanisms 58, while the card-lowering mechanisms 57 are not activated, the IC card 90 is retained at the position where the frontal end of the IC card 90 has been met by the stopper 53 but the IC card 90 has not been lowered yet. When the card-lowering mechanisms 57 are activated, the IC card 90 is lowered along with the support tables 58a in the direction indicated by "Z". The IC card 90 approaches the IC card connector 10, and the surface contacts 92a of the IC card 90 touch the data-passing contacts 12 of the IC card connector 10.

As the grounding contact 13 is positioned out of the area directly under the contact block 92, by the data-passing contacts 12 in the housing 11 of the IC card connector 10 and extrudes higher above the housing 11 than the data-passing contacts 12, the grounding contact 13 touches the lower surface 91a of the IC card 90 at a point outside the contact block 92 before the data-passing contacts 12 of the IC card connector 10 connect with the surface contacts 92a in the contact block 92 of the IC card 90, as shown in FIG. 4B.

Through this grounding contact 13 touching the lower surface 91a of the IC card 90, all static electricity charged over the IC card body 91 before the insertion as well as after the insertion is discharged.

As the grounding contact 13 is formed of an elastic strip, it is capable of deforming elastically. After the contacting portion 13a of the grounding contact 13 has touched the lower surface 91a of the IC card 90, the IC card 90 is lowered a little further by the card-lowering mechanisms 57. As a result, the grounding contact 13 deforms making the extrusion height H2 smaller.

When the extrusion height H2 of the grounding contact 13 becomes the same as the extrusion height H1 of the data-passing contacts 12, the contacting portions 12a of the data-passing contacts 12 touch the surface contacts 92a of the IC card 90. The card-lowering mechanisms 57 have a stoke long enough to lower the IC card 90 still further after the meeting of the data-passing contacts 12 and the surface contacts 92a, so that the resiliency created in the elastic, data-passing contacts 12 press the contacting portions 12a onto the surface contacts 92a of the contact block 92. As a result, the contacts of both the IC card 90 and the IC card connector 10 are securely connected to each other, as shown in FIG. 4C.

In the above IC card connector 10, the grounding contact 13 is provided by one side of the block of the data-passing contacts 12. The present invention is not limited to this arrangement of the contacts. Two or three or more grounding contacts may be provided. For example, another grounding contact may be provided by the other side of the block of the data-passing contacts 12.

In the above IC card reader/writer 50, in order to connect the surface contacts 92a of the IC card 90 with the data-passing contacts 12 of the IC card connector 10, the IC card 90 is horizontally transferred after insertion, and then it is lowered. The present invention is not limited to this arrangement of card transfer. For example, after the IC card 90 is horizontally transferred, the IC card connector 10 may be lifted, so that the data-passing contacts 12 connect with the surface contacts 92a.

Furthermore, it is not necessary that the upward or downward movement of the IC card 90 or the IC card connector 10 be vertical as in the above embodiment. The movement upward or downward of either the IC card 90 or the IC card connector 10 can be carried out with inclination.

With reference to FIG. 5, description is given about another embodiment of the IC card connector of the present invention, which is incorporated in an IC card reader/writer.

This IC card connector 100 comprises a housing 111, a plurality of data-passsing contacts 112, and a grounding contact 113 in a similar way to the previous embodiment.

This housing 111 is formed of an insulative material, and it has contact openings 111a and 111b, through which the contacting portions 112a and 113a of the data-passing contacts 112 and the grounding contact 113, which are placed inside, extrude a little. It also has lead openings 111c and 111d on both sides, through which the lead portions 112c and 113c of the data-passing contacts 112 and the grounding contact 113 extrude outward.

The data-passing contacts 112 and the grounding contact 113 are formed of a strip of electrically conductive material in similar configurations to the data-passing contacts 12 and the grounding contact 13 of the previous embodiment. Therefore, each of these components is indicated with a numeral which is greater than that of its corresponding element of the previous embodiment by 100, and description of these components is not given here.

In this IC card connector 100, all the extruding tops 112b and 113b of the data-passing contacts 112 and grounding contact 113 are formed with a same height H3 above the upper surface 111e of the housing 111.

This IC card connector 100 is designed for an IC card reader/writer which transfers an IC card only horizontally for reading and writing in the IC card. When the IC card 90 is inserted into such an IC card reader/writer, the IC card body 91 of the IC card 90 being horizontally transferred is first touched by the grounding contact 113 of the IC card connector 100. Then, the surface contacts 92a of the IC card 90 are contacted by the data-passing contacts 112 of the IC card connector 100 when the IC card 90 is further transferred horizontally.

In this IC card reader/writer, the IC card 90 approaches the IC card connector 100 from the direction indicated by arrow X. Therefore, the grounding contact 113 of this IC card connector 100 is positioned forward by a distance L from the frontal row of data-passing contacts 112, which are closer to the approaching IC card 90, in the housing 111.

Moreover, this IC card reader/writer is so designed that the IC card 90 is loaded into the IC card reader/writer with the lower surface 91a of the IC card 90 positioned a little lower, or closer to the upper surface 111e of the housing 111, than the extrusion height H3 of the extruding tops 112b and 113b of the data-passing contacts 112 and the grounding contact 113.

With this construction, when the IC card 90 is inserted and loaded into the IC card reader/writer, the lower surface 91a of the IC card 90 is first encountered by the grounding contact 113 of the IC card connector 100. In this encounter, the IC card 90 deforms the grounding contact 113 elastically, lowering it a little. The resiliency created in the grounding contact 113 by this elastic deformation forces the grounding contact 113 to press its contacting portion 113a onto the lower surface face 91a of the IC card 90. Through this attachment of the grounding contact 113, the static electricity over the IC card 90 is discharged.

As the loading of the IC card 90 progresses, the surface contacts 92a in the contact block 92 on the lower surface 91a of the IC card 90 contact the data-passing contacts 112. Then, the transfer of the IC card 90 stops, and the IC card 90 is fully loaded in the IC card reader/writer.

When the surface contacts 92a of the IC card 90 meet the data-passing contacts 112 of the IC card connector 100, the data-passing contacts 112 are elastically deformed and lowered a little. The resultant resiliency created in the data-passing contacts 112 by this elastic deformation forces the data-passing contacts 112 to press the contacting portions 112a onto the surface contacts 92a of the IC card 90. As a result, the IC card 90 is securely connected to the IC card reader/writer through the IC card connector 100.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Related Applications

This application claims the priority of Japanese Patent Application No. 7-112393 filed on Apr. 13, 1995, which is incorporated herein by reference.

What is claimed is:

1. An IC card reader/writer comprising:
   an IC card connector, in which the extruding height of a grounding contact is higher than that of data-passing contacts above the upper surface of a housing, said IC card connector provided in said IC card reader/writer;
   a card-transferring mechanism, which transfers an IC card inserted into said IC card reader/writer to a facing position where said IC card is placed facing said IC card connector vertically apart in said IC card reader/writer; and
   a raising/lowering mechanism, which transfers either one of said IC card or said IC card connector vertically after said IC card is placed at the facing position, so that said IC card and said IC card connector approach each other;
   when said raising/lowering mechanism functions, said grounding contact of said IC card connector touching the surface of said IC card first, and then said data-passing contacts of said IC card connector connecting with a surface contacts of said IC card, whereby reading and writing information in said IC card is made ready.

2. An IC card reader/writer comprising:
   an IC card connector, in which a grounding contact and data-passing contacts are retained apart at predetermined distance in a housing, said IC card connector provided in said IC card reader/writer; and
   a card-transferring mechanism, which transfers an IC card inserted into said IC card reader/writer laterally in such a way that said IC card approaches said IC card connector from the side of said grounding contact;
   through the function of said card-transferring mechanism, said grounding contact of said IC card connector touching the surface of said IC card before said data-passing contacts of said IC card connector connect with a surface contacts of said IC card, whereby reading and writing information in said IC card is made ready.

3. An IC card connector for use in an IC card reader/writer having a raising/lowering mechanism for moving the IC card and the IC card connector relatively together to enable the IC card connector to establish electrical connection with the IC card by contacting surface contacts provided thereon, the IC card connector comprising:
   a grounding contact, for touching a surface of said IC card excluding an area of said surface contacts;
   a group of data-passing contacts, for connection with said surface contacts;
   a housing, which retains said grounding contact and said group data-passing contacts therein and can receive said IC card; and
   guiding means in the housing for aligning said surface contacts of said IC card inserted therein and said group of data-passing contacts in face-to-face relation, and spaced apart vertically, and for guiding said IC card connector and said IC card vertically relatively together to connect the group of data-passing contacts with said surface contacts of said IC card during operation of the raising lowering mechanism; said grounding contact having a greater vertical height than said data-passing contacts so that said grounding contact protrudes vertically beyond said group of data-passing contacts towards the IC card so that during relative movement together, the surface of said IC card excluding the area of said surface contacts is brought into engagement first with said grounding contact and then with said group of data-passing contacts of said IC card connector.

4. An IC card connector for use in an IC card reader/writer having a lateral IC card transferring mechanism for moving the IC card in a lateral direction, edge first, relatively toward the IC card connector to enable the IC card connector to establish electrical connection with the IC card by contacting surface contacts provided thereon, the IC card connector comprising:
   a grounding contact, for touching a surface of said IC card excluding an area of said surface contacts;
   a group of data-passing contacts, for connection with said surface contacts;
   a housing, which retains said grounding contact and said group of data-passing contacts therein and can receive said IC card; and
   guiding means in the housing for aligning said surface contacts of said IC card inserted therein and said group of data-passing contacts in lateral, spaced apart relation, and for guiding said IC card edge-first in said lateral direction toward said IC card to connect the group of data-passing contacts with said surface contacts of said IC card during operation of the lateral IC card transferring mechanism, said grounding contact being located laterally beyond said group of data-passing contacts in said lateral direction so that said grounding contact protrudes in said lateral direction towards said edge of the IC card so that during relative movement together, the surface of said IC card excluding the area of said surface contacts is brought edge first into engagement first with said grounding contact and then with said group of data-passing contacts of said IC card connector.

5. An IC card connector according to claim 4 wherein said group of data-passing contacts are arranged in a substantially planar array.

6. An IC card connector according to claim 5 wherein said group data-passing contacts are arranged in a substantially planar array.

7. An IC card connector for use in an IC card reader/writer having a raising/lowering mechanism for moving the IC card and the IC card connector relatively together while located in parallel, spaced apart, face to face relation to enable the IC card connector to establish electrical connection with the IC card by contacting surface contacts provided thereon, the IC card connector comprising:
   a grounding contact, for touching a surface of said IC card excluding an area of said surface contacts;
   a group of data-passing contacts, for connection with said surface contacts;
   a housing, which retains said group of data-passing contacts on a face thereof in substantially planar array perpendicular to a raising/lowering direction and retains said grounding contact protruding in the raising/ lowering direction beyond said group of data-passing contacts so that during relative movement together in the raising/lowering direction, the surface of said IC card excluding the area of said surface contacts is brought into engagement first with said grounding contact and then with said group of data-passing contacts of said IC card connector.

8. An IC card connector for use in an IC card reader/writer having a lateral IC card transferring mechanism for moving the IC card in a lateral direction, edge first, relatively toward the IC card connector to enable the IC card connector to establish electrical connection with the IC card by contacting surface contacts provided thereon, the IC card connector comprising:

a grounding contact, for touching a surface of said IC card excluding an area of said surface contacts;

a group of data-passing contacts, for connection with said surface contacts;

a housing, which retains said group of data-passing contacts on a face thereof in substantially planar array parallel to the lateral direction and retains said grounding contact protruding in the lateral direction beyond said group of data-passing contacts so that during relative movement together in the lateral direction, the surface of said IC card excluding the area of said surface contacts is brought into engagement, edge first, with said grounding contact and then with said group of data-passing contacts of said IC card connector.

* * * * *